United States Patent Office 3,310,982
Patented Mar. 28, 1967

3,310,982
NAVIGATION SYSTEM WITH VEHICLE MOTION SIGNALS MODIFIED BY DRIFT ANGLE SIGNALS
Joseph Yamron, West Hartford, Conn., assignor to United Aircraft Corporation, East Hartford, Conn., a corporation of Delaware
Filed Aug. 31, 1961, Ser. No. 135,358
2 Claims. (Cl. 73—178)

This invention relates to a novel guidance and control system for space vehicles, and particularly to a system for providing a high degree of accuracy by calibrating gyro and accelerometer bias errors and gyro pendulosity errors during the flight of the space vehicle.

The injection of a satellite into a precise orbit to pass accurately over specified points on the earth's surface, and to re-enter and land within a small pre-selected area is a difficult problem for the conventional ballistic type of guidance system. The trajectory is not in the general case planar, the effects of the atmosphere are not negligible, and range or time flight is relatively long. Conventional radio or inertial guidance systems are incapable of handling such a problem. A stellar or radio aided inertial unit or a combination of both, employing an explicit guidance scheme, can perform this task with a high degree of accuracy. The novelty of the present system is to provide, periodically during flight, a calibration of bias errors occurring in the particular inertial measurement unit used, and is applicable to satellites as well as to ballistic missiles where only one target is involved. It is also applicable to an aero space plane.

It is therefore an object of this invention to provide a novel space vehicle guidance and control system.

Another object of this invention is to provide a means for correcting the flight characteristics of a space vehicle.

A further object of this invention is to provide a novel space vehicle guidance system which will measure gyro and accelerometer bias errors and gyro pendulosity errors during flight and correct the flight of the vehicle to compensate for those errors.

Figure 1:
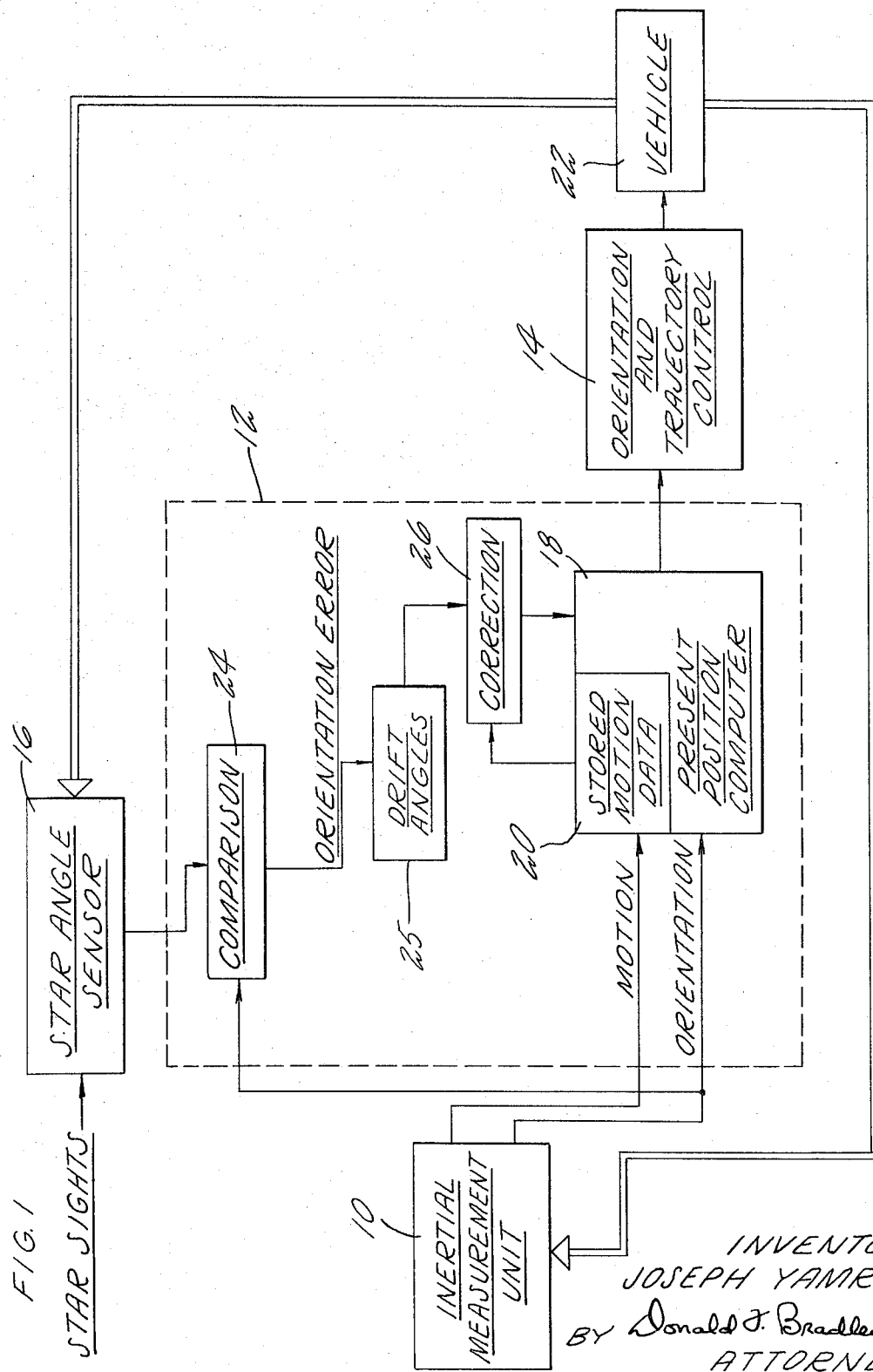
Figure 2:
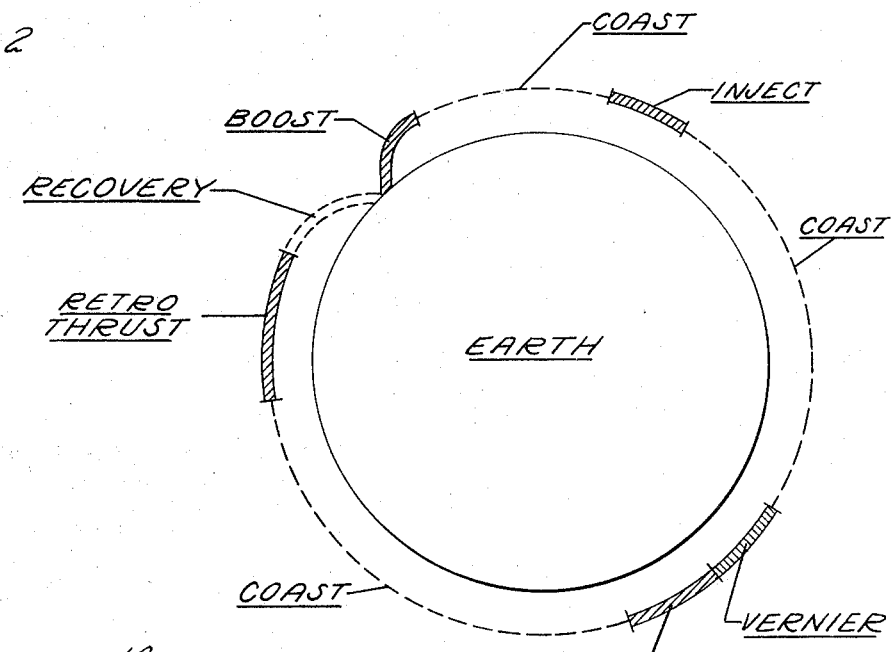
Figure 3:
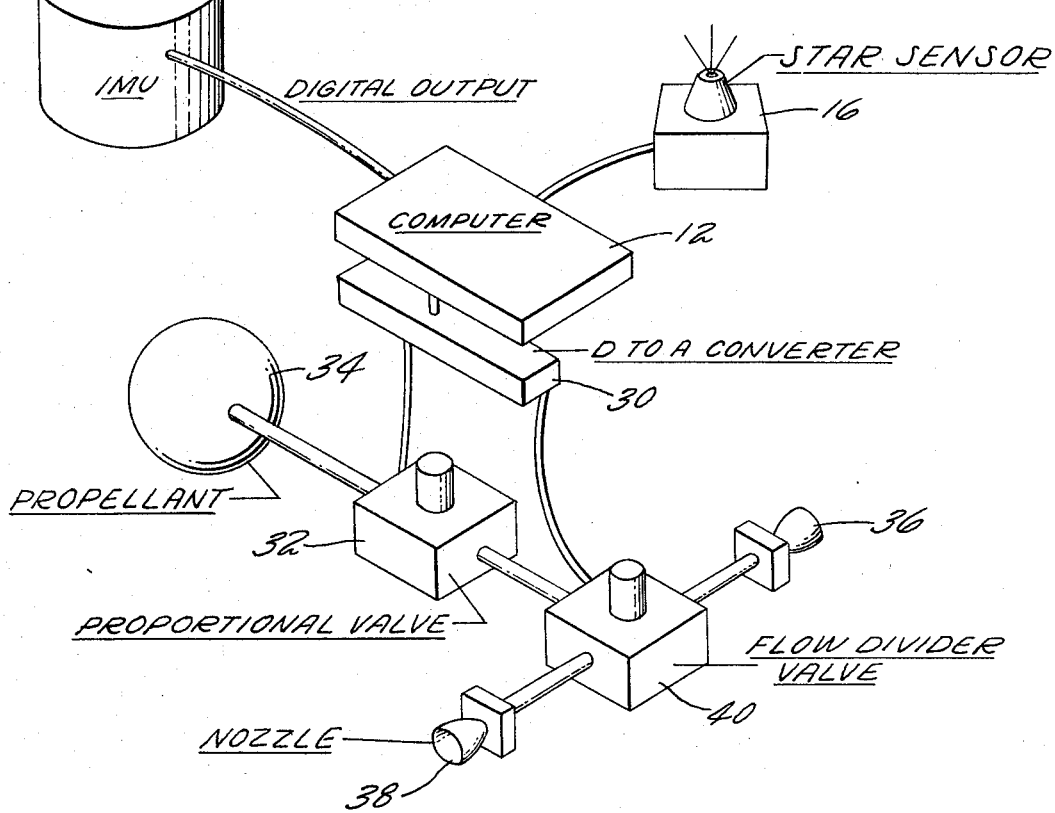

These and other objects and a detailed description of the invention may be had by referring to the following description, read in conjunction with the attached drawings, in which:

FIG. 1 shows in block diagram form a guidance system for a maneuverable space vehicle incorporating this invention; and FIG. 2 shows schematically a steering method for orbiting vehicles; and FIG. 3 shows schematically the major components of a guidance system incorporating this invention.

The design of an aided guidance system to inject a space vehicle into orbit, guide the vehicle over two specified points on the surface of the earth at a precise altitude, and then to guide the vehicle to a preselected landing point on the earth requires the following items: First, a precise knowledge of initial launch conditions, including vertical, position, and azimuth; Second, a steering method; and third, mechanization to provide the desired accuracy. These items will be taken up in order.

Fir fixed land based launch sites, initial position and velocity will be accurately known. The initial orientation about all axes of the inertial measurement unit can be precisely measured and controlled prior to launch. Optical alignment means may be used for the purpose.

The determination of a steering method for a low orbit satellite guidance system is complicated by the fact that most of the trajectory is within the sensible atmosphere and hence extrapolation of position and velocity with time have large uncertainties associated with them.

Also, the time of flight to a specific point over the earth's surface is difficult to estimate, hence the determination of the orbital plane over a line on the earth at that point has large errors associated with it, and the oblateness of the earth's surface and atmosphere requires an injection scheme that will avoid entering to deeply into the atmosphere at the equatorial bulge. This type of flight path does not lend itself readily to a pre-computed trajectory, nor to conventional inject-and-coast type of steering. FIGURE 2 shows schematically a steering method for the injection of a satellite into an orbit to pass over a target and then to return to the earth's surface. This novel steering method will produce extreme accuracy, and is described and claimed in copending application Ser. No. 135,338, entitled "Steering System for Maneuverable Space Bodies," filed Aug. 31, 1961, and now abandoned. The novel steering method described in the referenced copending application is hereby incorporated into the present application, since such a steering method is well adapted for use with the present invention.

The mechanization of a stellar-inertial system which may be used to practice this invention is described and claimed in copending application Ser. No. 115,867, entitled, "Guidance System," filed June 7, 1961. This system employs as primary components, as shown in FIG. 1, an inertial measurement unit 10, a digital computer 12, an orientation and trajectory or attitude control system 14, and a star angle sensor 16. The measurement accuracy of the star angle sensor is the principal limitation on the precision of vehicle guidance. In this system the error can be held to a few seconds of arc, or to a few hundreths of a foot per second. FIG. 1 shows in block diagram form the operation of a guidance and control system for maneuverable space vehicles incorporating this invention. The inertial measurement unit 10 contains the gyros and accelerometers which are used to determine the flight path and orientation of the vehicle at all times. The output signals from the gyros and accelerometers indicative of vehicle orientation and motion are fed to a computer 12. The computer 12 is the heart of the system, and is shown enclosing other blocks which illustrate various functions of the computer.

The gyro and accelerometer signals are fed to a present position computer 18 within computer 12 where the signals are operated upon to produce an indication of present vehicle position relative to launch position. Launch position data is stored in computer 12 prior to launch. The motion signals, i.e., the accelerometer readings, are stored in the computer at selected intervals as shown at block 20. From the vehicle present position data and stored target data a trajectory to the target is computed, and orientation and trajectory control equipment 14 will maintain the vehicle 22 on this course. Changes in the position and/or orientation of vehicle 22 are fed back to the inertial measurement unit 10 and star angle sensor 16 since they are physically connected to the vehicle.

The star angle sensor 16 takes star sights during flight, and the vehicle orientation readings generated from the star sights are compared with the orientation signals from the gyros in comparison block 24. Any deviation is assumed to be produced by gyro drift, and this orientation error is integrated at block 25 into a plurality of drift angle signals corresponding to the time intervals at which the accelerometer readings were stored. The drift angle signals are then fed to correction block 26 where the stored accelerometer readings from block 20 are corrected and the corrected values fed to present position computer 18 to update and correct the present position data. A new trajectory to the target may also be required. The details of this operation will be described subsequently.

The approach to the problem of providing a high degree of accuracy for satellite guidance is to provide an inflight calibration of gyro accelerometer and bias errors and gyro pendulosity errors which contribute substantially to the overall trajectory error. In so doing, only those errors which are essentially of a random nature or which vary with gravity remain. In the case of a platform system, one class of random errors is associated with deformation of the platform structure under the acceleration and vibration imposed by powered flight. The gyro instruments themselves have a random component of error. Test data indicates that the random variation is very slow compared with powered flight times, and therefore, can be treated as a bias error. A calibration of the inertial measurement unit accomplished just before flight should yield the best value of gravity sensitive errors. Bias errors of both gyros and accelerometers and gyro pendulosity errors are then ascertained and corrected with an inflight calibration. It should be pointed out that strapped down guidance systems will not suffer from those random errors associated with structural deformation of gimbals and the elimination of the bias errors makes the strapped down system very attaractive.

The inertial measurement unit 10 comprises three gyros and three accelerometers. The bias and pendulosity corrections illustrated above are used to update the gyro and accelerometer calibrations stored in the digital computer 12. Since these calibrations are in turn used to correct subsequent gyro and accelerometer readings directly, the system is free of error until the biases change.

It should be noted that this identical approach can be used for ballistic missiles as well as satellites, although the precise pre-launch calibration and alignment procedure described in copending application 115,867 may not be considered to be tactically useful for a ballistic missiel system. This is so because of the penalty exacted by the lack of system readiness.

The operation of the system of this invention will now be described. Prior to launch, the inertial measurement unit 10 is precisely aligned and calibrated. Targets, orbital parameters, and recovery point, if desired, are inserted as well as correct sidereal time and appropriate star pairs. During powered flight an approximate trajectory is flown, similar to that described in application Ser. No. 115,867. After burn-out the satellite which contains all of the guidance equipment is oriented to take sights on 2 stars approximately 90° apart on the celestial equator, and from this data and the initial conditions stored in the computer, bias determinations emanate. The trajectory is recalculated based on stored values of acceleration accumulated at intervals during powered flight. Present position is determined and a correction made to the trajectory of the satellite or ballistic missile in a manner similar to that described in application Ser. No. 115,867.

The preferred inertial meansurement unit 10 utilizes three single degree of freedom integrating gyros and three force balance accelerometers. Star angle sensor 16 shown in FIG. 3 may be inserted directly in the casting holding the inertial package 10. Two degree of freedom gyros could be used, but these are more susceptible to random errors resulting from deformation of the gyro gimbals during boost or flight. Both gyros and accelerometers are pulse torqued to null in the manner described by application Ser. No. 115,867. Gyro and accelerometer pulse counts are maintained in the computer 12 to provide base motion isolation of the accelerometer data. The output of the sensors for each sampling cycle represents the incremental orientations and accelerations experienced by the vehicle during the cycle. Each inertial sensor is pulse torqued and emits a continuous digital pulse train, which is counted in the computer 12 during each sampling cycle. The total binary count for each cycle is representative of an angle or acceleration magnitude.

Since the six sensors concerned are all fixed with respect to the vehicle frame, their outputs must be transformed to give outputs relative to the inertial reference axes. Therefore, nine directional cosines, relating the missile axes to the inertial reference axes, are first calculated. In this calculation, the incremental rotation of each body axis is integrated for the time period and added to the previous directional cosine. The body-axis accelerations are then converted to inertial-axis accelerations by using the nine directional cosines developed.

The resolved accelerations are corrected to eliminate gravity components and then integrated to provide velocity components along the inertial reference coordinates. The velocity components are in turn integrated to provide the inertial-distance vectors, and the distance vectors are then combined to give the current radius vector from the center of the earth to the missile.

The inertial measurement unit 10 is located in the satellite or ballistic missile itself along with the orientation and trajectory control system 14, the digital computer 12, and the star angle sensor 14 or radio receiver. Prior to launch, the nine directional cosines of the input axes of the inertial measurement unit 10, with respect to a set of inertial axes referred to in application Ser. No. 115,867, the ENU coordinate system, are determined by optical measurement and entered into the digital computer 12 along with up to date instrument calibration data acquired just prior to launch.

The digital computer 12 may be a synchronous modified-serial, stored-program, general purpose machine similar to the digital computer described in application Ser. No. 115,867. The machine must perform its functions as follow.

The target position, in terms of coded latitude and longitude and altitude, is fed into the computer's memory. The computer converts the angular geographical-coordinate target data into distance components along the inertial reference axes, whose origin is at the earth's center. These distance components include the necessary corrections for the oblateness of the earth.

Following the target-data conversions, the computer proceeds to the star-set selection routine. The set of stars to be sighted on is actually continuously reselected by the computer during the course of movement associated with the pre-launch phase. Utilizing the greenwich hour angle of the vernal equinox stored as an initial-condition input, the longitude of the launching point as determined by the present-position determination routine, and the sidereal time that has elapsed since the star tables were inserted, the computer determines from the stored star tabulations the optimum star set for the launching position.

The target and launching positions in inertial-reference coordinates and the stored reference trajectory form the inputs to an iterative routine that computes the best trajectory for the particular mission. First, the earth angle from the launching position to the target position is calculated. Then the desired cutoff velocity to be achieved at the end of the powered-flight phase is calculated by using a hit equation and the stored trajectory variable. Once the desired cutoff velocity has been established, the time of flight is computed. This time is used in connection with the earth's rotation rate to compute a new target location, in inertial coordinates, at the time of impact. The revised target location is the basic data input for a repetition of the entire cycle, which is repeated until both the cutoff velocity and the time of flight are established to a predetermined accuracy. When these accuracy requirements are satisfied, the latest tabular values of trajectory time of flight, earth angle from the launching position to the target position, and target position are stored for subsequent use by the steering routine employed during the powered-flight phase.

The present position determination routine carried out by the computer is designed to maintain up-to-date information on the vehicle-velocity magnitude, the vehicle velocity orientation, and the position of the vehicle in inertial space. To provide this information, the computer samples the output signals of the inertial measurement unit at discrete intervals, computes the increment change in vehicle velocity magnitude, vehicle velocity orientation, and vehicle position since the previous sample and up-dates the previous data appropriately. At predetermined intervals, the current data, up-dated cycle by cycle, is recorded in permanent memory locations as the experienced trajectory data for use in the subsequent trajectory recalculation.

As a subroutine of the present-position determination routine, the gravitational constant at the earth's surface is periodically corrected to reflect the earth's oblateness at the current missile position. This subroutine is performed once during the course of 10 to 20 cycles of the present-position determination routine.

To perform the first star sight, the satellite must be reoriented so that the viewing axis of the star angle sensor lies along, or very nearly parallel to, the vector between the satellite and the star that has been selected to be viewed. The relationships between the inertial direction cosines of the star position and also between the direction cosines between the satellite axes and the approximate inertial axes calculated by the computer provide the approximate direction cosines between the satellite axes and the star position. The vehicle is rotated to the proper attitude by computer commands to the control equipment 14. The computer generates rate commands in yaw, pitch, and roll that allow the inertial-to-body-axis direction cosines to decrease to a predetermined order of magnitude. The reorientation of the satellite is a closed-loop operation in which the inertial sensors in the inertial measurement unit measure the orientation change as an extension of the present-position determination routine. Recognition of the on-star condition permits the computer to signal the start of the star-sighting operation by the star angle sensor 14.

When the vehicle is in free flight, in a flight when no thrust or outside accelerations including gravity are being applied to the vehicle, the accelerometer outputs are sensed. Assuming that the vehicle is above the sensible atmosphere, that is, in an essentially zero g environment which is at approximately 600,000 feet or above, the accelerometer outputs should be zero. If the accelerometer outputs are not zero, the outputs are assumed to be and are treated as bias errors, that is, constant errors in the accelerometer outputs due to the instrument itself or due to improper instrument alignment. The errors are then subtracted from the accelerometer outputs stored during the powered trajectory.

When accelerometer bias is measured on the ground, and the accelerometer is set to indicate zero acceleration, the gravity forces acting on the accelerometer make it difficult to set or align the accelerometer with great precision. In space, with no external forces and a substantially zero g field, the bias can be measured by at least two orders of magnitude better than it can be measured on the ground. It is therefore obvious that if the accelerometer output is anything but zero at that time, the output indication must be caused by a bias error. Consequently, the bias error has entered into all velocity and position computations up to that time, since velocity and position are computed by integrating the outputs of three orthogonal accelerometers, and the present position of the vehicle as indicated by the computer is in error by an amount which is a function of the accelerometer bias error. If the trajectory is reintegrated with the accelerometer bias error removed, a more accurate present position indication is obtained.

From the output of the two star sights the error direction cosines relating the approximate $\overline{ENU}$ system with respect to the true ENU system can be computed, since the launch conditions were precisely known. Errors in the direction cosines are assumed to result totally from gyro bias and pendulous drift. If the assumption is made that the bias and pendulosity are in fact true and do not change during the few minutes of powered flight, then the total rotation of the coordinate system produced by this drift can be integrated into a set of drift angles in block 26 corresponding to those intervals at which the accelerometer were read during the powered flight. Each stored accelerometer value in block 20 is modified again accordingly.

The drift terms for bias and pendulosity can be represented by three constant terms for each gyro. These terms, a total of nine, can be determined from the data from three sights, ideally at burn-out, prior to injection, and at the end of injection. The complexity, or lack of it, required for any application is dependent on the stability of the instruments being corrected. Terms including anisoelastic corrections can be made if sufficient star sights are taken.

When each of the stored acceleration values has been properly corrected, as described above, the trajectory may be reintegrated using the precise initial conditions to obtain the true present position, and vernier steering initiated as described in copending applications 115,867 and 135,338 to reach the target.

Upon completion of the trajectory recalculation to the present position, trajectory-correction computations are started. The computations required for trajectory correction duplicate the trajectory-computation routine followed in the pre-launch and powered flight phases, utilizing the corrected inertial-velocity and position data. By comparing the desired velocity orientation and the measured velocity orientation, the computer generates roll, pitch and yaw signals for use by the attitude control system of the satellite control equipment. Based on the difference between the desired and measured velocity magnitudes, the computer generates commands for the velocity-correction system of the satellite control equipment.

A radio fix may be employed instead of star sights to remove the effect of instrument bias errors. If present position and/or velocity information is inserted into the computer at a known time by sending a message to the vehicle by means of a data link, the position tracking loop may be up-dated. The information may be obtained by tracking apparatus. To obtain gyro bias values, it is necessary to assume a bias drift, reintegrate the trajectory to obtain a new present position or velocity and then iterate the process in the computer until the new present position or velocity is equal to the fix. The mathematics used in the iteration process is well known and need not be described here.

The value of the employment of a radio fix in the mission is that the bias calibrations are obtained. Bias calibration obtained in this fashion may be used in the computer as part of the instrument calibration.

The orbital steering and control function is the subject matter of copending application Ser. No. 135,338 and will not be described here.

Once the initial trajectory correction has been made, the satellite is essentially in an orbital path. Any errors which are likely to develop, which will effect subsequent trajectory corrections, will result from changes in the biases and gyro pendulosity. At intervals, which could be typically every 20 minutes or every orbital pass as determined by the computer clock, the orientation equipment is used together with the star angle sensor 14 to obtain additional pairs of star sights using appropriate sets of star selected prior to launch to obtain new star angle data. Since the initial conditions were precisely known, they can be recalculated using the methods outlined in application 115,867. Any error in this calculation can be attributed to a change in bias errors and/or gyro pendulosity and the procedure outlined previously can be repeated to obtain a new set of instrument corrections.

The orientation and trajectory (attitude) control equipment shown in FIG. 3 is similar to that described in copending application Ser. No. 115,867 except for lower control rates. The orientation equipment is a stored gas system capable of minimum control rates of $1/10$ of a milliradian per second. The trajectory control equipment is a bi-propellant system which ignites hypergolically.

As shown in FIG. 3, the orientation and control equipment is responsive to signals from computer 12 which are converted to analog signals in digital to analog converter 30. Inputs to the computer are provided by inertial measurement unit 10 and star angle sensor 16 as shown in FIG. 1. The computer output signals are fed to a proportional valve 32 which regulates the flow of high pressure nitrogen gas from container 34 to nozzles 36 and 38. Flow divider valve 40 regulates the amount of flow to each nozzle to balance the system.

The star angle sensor 16 is basically similar to that described in copending applications Ser. No. 115,867 and claimed in U.S. Patent No. 3,242,795. One important difference must be noted, however. Since all initial conditions are precisely known at launch, the field of view required is no longer dictated by the amount of launch position errors or the initial orientation error of the inertial measurement unit. Instead, the field of view requirement, is determined by the amount of error which the inertial measurement unit will experience during powered flight. In the case of a platform system, this would be interpreted directly as rotation of the platform about all of its axes. In the case of the strapped down unit described herein, the axes rotation is determined by pulse counts and is expressed mathematically in the computer. The amount of this rotation for typical high performance inertial instruments, should be less than 5 minutes of arc. A total field of view requirement is established, as 10 minutes of arc, roughly $1/12$ of that required in application Ser. No. 115,867. If the dynamic range of the read-out device for the star angle sensor is 300 to 1, a 2 second of arc system may be considered. This means that a 90,000 element solid state or film detector could resolve a 2 second of arc error and thus eliminate the photomultiplier. Such detectors are available (GaAs for example). The reduction of the field of view and the dynamic range and a reduction in the minimum attitude control rate results in an increase in the signal to noise ratio of the detector. This is important because of the inherent low sensitivity of solid state and film detectors.

While the present invention has been described with a certain degree of particularity, it is obvious that numerous changes may be made to the components and the arrangement of the system without departing from the scope of the invention.

I claim:

1. In a navigational system for a space vehicle launched from a known position and having known reference axes orientation at launch in a selected coordinate system, said navigational system comprising a plurality of accelerometers connected with said vehicle for producing signals indicative of vehicle motion, gyro means for producing signals indicative of vehicle orientation relative to said launch reference axes, means acting upon said vehicle motion and orientation signals and producing therefrom data indicative of vehicle velocity and position in said coordinate system, additional means for storing said vehicle motion signals at selected times during flight, and stellar sensor means connected with said vehicle for producing from selective star sights during flight data indicative of said reference axes orientation, the improvement comprising means for comparing said reference axes orientation data produced from said star sights with said launch reference axes orientation and producing an error signal indicative of coordinate system rotation during flight, means for producing from said error signal a plurality of drift angle signals corresponding to the times at which said vehicle motion signals were stored, means for modifying said stored vehicle motion signals in response to said drift angle signals, and means for producing updated vehicle velocity and position signals from said modified vehicle motion signals.

2. A navigational system as in claim 1 in which said error signal is integrated to produce said drift angle signals.

References Cited by the Examiner

UNITED STATES PATENTS 3,029,016  4/1962  Shapiro et al. _____ 235—61

FOREIGN PATENTS 863,457  3/1961  Great Britain.

OTHER REFERENCES

Carroll: "Optical Resection and Inertial Systems," Aero/Space Engineering, vol. 18, No. 3, March 1959, pp. 53–55, 75.

Lear: "New Principles in The Design of Superior . . . Missile Guidance Systems," Agard, #21, September 1956, pp. 29–38.

Nichinson: "An Automatic Astro Compass," Navigation, vol. 6, No. 3, autumn 1958, pp. 182–189.

Stevens: "Aiding the Inertial Navigation System," Navigation, vol. 6, No. 3, autumn 1958, pp. 166–174.

BENJAMIN A. BORCHELT, *Primary Examiner.*

CHESTER L. JUSTUS, SAMUEL FEINBERG,
*Examiners.*

A. E. HALL, T. A. ROBINSON, M. F. HUBLER,
*Assistant Examiners.*